F. JARVIS.
EMERGENCY TIRE.
APPLICATION FILED MAY 2, 1917.
1,265,666.
Patented May 7, 1918.
Fig. 1.
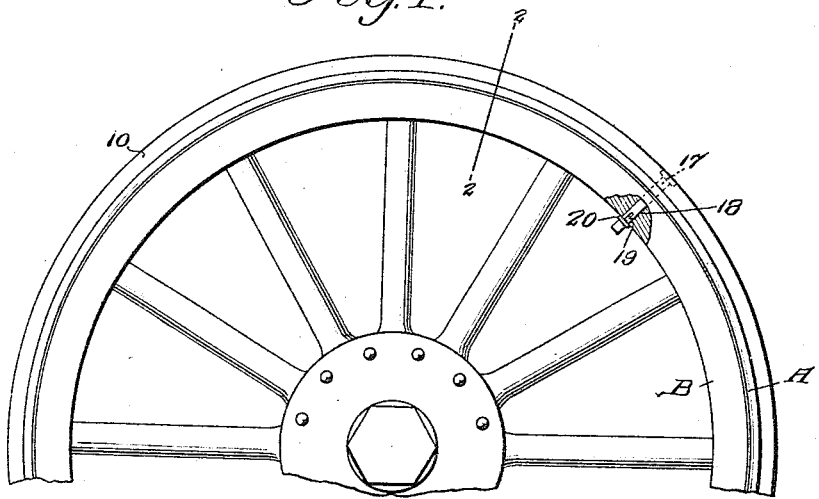
Fig. 2.
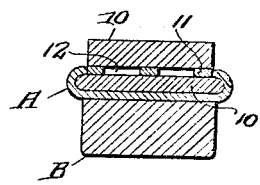
Fig. 4.
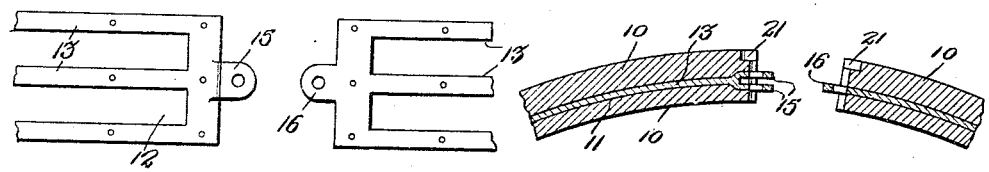
Fig. 3.
WITNESSES
J. H. Crawford
Edward Yeager
INVENTOR
Frank Jarvis,
BY Victor J. Evans
ATTORNEY

UNITED STATES PATENT OFFICE.

FRANK JARVIS, OF KINGS PARK, NEW YORK.

EMERGENCY-TIRE.

1,265,666.         Specification of Letters Patent.         Patented May 7, 1918.

Application filed May 2, 1917. Serial No. 165,945.

*To all whom it may concern:*

Be it known that I, FRANK JARVIS, a citizen of the United States, residing at Kings Park, in the county of Suffolk and State of New York, have invented new and useful Improvements in Emergency-Tires, of which the following is a specification.

This invention comprehends the provision of an emergency tire for automobiles and the like, the object of the invention being to provide a solid tire which can be cheaply manufactured from suitable material, and which in addition to being puncture proof, is constructed to permit of the same being quickly and easily applied to or removed from the rim of the wheel.

The nature and advantages of the invention will be better understood when the following detail description is read in connection with the accompanying drawing, the invention residing in the construction, combination and arrangement of parts as claimed.

In the drawing forming part of this specification like numerals of reference indicate similar parts in the several views and wherein:—

Figure 1 is a fragmentary side elevation of a wheel showing my tire applied thereto.

Fig. 2 is a sectional view taken on line 2—2 of Fig. 1.

Fig. 3 is an enlarged detail sectional view of the ends of the tire separated.

Fig. 4 is an enlarged fragmentary view of the metallic member.

A tire constructed in accordance with my invention preferably embodies a plurality of concentrically disposed split bands, which may be constructed from any material suitable for the purpose. Any number of such bands may be employed in the production of a single tire, but as shown in this particular instance three of such bands are used, the inner and outer bands 10 by preference being constructed from leather, while the intermediate band 11 is formed from metal. The bands are secured together at spaced points throughout their length in any suitable manner. The metallic band 11 is employed as a reinforcing element for the tire, and further utilized to prevent stretching of the bands 10. The band 11 is preferably slotted longitudinally for the major portion of its length as at 12 thus providing a number of parallel separated portions or strips 13. One extremity of the metallic band has a double thickness as shown and projects beyond the corresponding extremity of the tire proper, in the form of spaced apertured lugs 15. The opposite extremity of the metallic band also projects beyond the corresponding extremity of the tire, and terminates to provide an apertured ear 16 to be received between the lugs 15 with the apertures or openings of these respective parts in alinement. A headed bolt 17 is passed through these apertures and also through the valve stem openings 18 in the rim A and felly B respectively. The shank of the bolt is slotted as at 19, the slotted portion projecting below the felly B, and adapted to receive a cotter pin or the like 20 for holding the bolt in operative position, and the tire in position upon the rim A. The outermost band 10 has its meeting ends provided with semicircular cut-away portions 21, which unitedly define an opening when the meeting ends are associated, for the reception of the head of the bolt, whereby the said head is counter-sunk to lie flush with the tread of the tire.

If the tire is made for use in conjunction with a rim having straight side flanges the respective bands 10 and 11 are of uniform width, while the combined thickness of the innermost band 10 and metallic band 11 is equal to the height of the flanges, so that the remaining band or bands will necessarily be of the desired thickness to project an appreciable distance beyond the side flanges of the rim so as to protect the latter from injury, as will be readily understood. However as shown in this instance, the tire is constructed for use in connection with a clencher rim, and by reason of which fact the innermost band 10 is considerably much wider than the remaining band, so that the innermost band 10 may be fitted within the grooves or channels of the rim A. The combined thickness of the innermost band and the metallic band 11 is such as to fill the rim, while the remaining band or bands are of the desired thickness to protect the rim against injury when the tire is in use. As hereinabove stated the tire is only intended for use in case of emergency, or as a substitute for an inflatable tire when the latter has become impaired by puncture, and the tire by reason of its construction can be very easily and quickly applied to the rim A as the occasion may require.

While it is believed that from the foregoing description the nature and advantages of the invention will be readily apparent, I desire to have it understood that what is shown and described is merely illustrative of the preferred embodiment of the invention to which I do not limit myself, and that such changes may be resorted to when desired as fall within the scope of what is claimed.

What is claimed is:—

1. An emergency tire embodying a metallic split band, split bands of relatively softer material concentrically disposed about the opposite sides of the metallic band respectively, said bands being secured together throughout their lengths, said metallic band having its ends projecting beyond the corresponding extremities of the other bands, and means coöperating with said projected extremities of the metallic band for detachably securing the ends of the tire together and to the rim.

2. The combination with a rim having a valve stem opening, of an emergency tire embodying a plurality of split concentrically disposed bands, the extremities of one of said bands being projected beyond the meeting extremities of the tire, said projected extremities being apertured and overlapped, and a headed bolt passed through said overlapped extremities and opening in said rim for securing the tire upon the latter, and means for holding the bolt in position.

3. The combination with a rim having a valve stem opening, of an emergency tire embodying a plurality of split concentrically disposed bands, the extremities of one band projecting beyond the corresponding extremities of the other bands and adapted to be disposed in overlapped relation, said projected extremities having openings adapted to aline with the opening of the rim, a headed bolt passed through said openings, the meeting ends of the outermost band defining an opening whereby the head of the bolt is counter-sunk in the tire, and means for holding said bolt in position to secure the tire upon the rim.

In testimony whereof I affix my signature.

FRANK JARVIS.